US009767329B2

(12) United States Patent
Forster (10) Patent No.: US 9,767,329 B2
(45) Date of Patent: Sep. 19, 2017

(54) NFC TAGS WITH PROXIMITY DETECTION (71) Applicant: Avery Dennison Corporation, Pasadena, CA (US)

(72) Inventor: Ian J. Forster, Essex (GB)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 145 days.

(21) Appl. No.: 13/803,041

(22) Filed: Mar. 14, 2013

(65) Prior Publication Data
US 2014/0139347 A1 May 22, 2014

Related U.S. Application Data (60) Provisional application No. 61/727,907, filed on Nov. 19, 2012.

(51) Int. Cl.
G08B 21/00 (2006.01)
G06K 7/10 (2006.01)
(Continued)

(52) U.S. Cl.
CPC ... *G06K 7/10128* (2013.01); *G06K 19/07309* (2013.01); *H04W 4/008* (2013.01); *H04W 12/12* (2013.01)

(58) Field of Classification Search
CPC ..... H04M 1/7253; H04B 5/00; H04B 5/0056; G06K 19/0723; G06K 19/0701;
(Continued)

(56) References Cited

U.S. PATENT DOCUMENTS 1,331,136 A 2/1920 Woodjard
5,083,111 A 1/1992 Drucker et al.
(Continued)

FOREIGN PATENT DOCUMENTS

BR PI0611910 2/2011
CN 101253750 8/2008
(Continued)

OTHER PUBLICATIONS

"AN1445: Antenna design guide for MFRC52x, PN51x and PN53x, Rev.1.2, Document AN1445_12", NXP B.V., (Oct. 11, 2010), 65 pgs.
(Continued)

*Primary Examiner* — Hoi Lau
(74) *Attorney, Agent, or Firm* — Avery Dennison Retail Information Services, LLC (57) ABSTRACT

Systems, apparatuses and methods provide for detecting the proximate placement of an external NFC reader to a specific location on a display surface. The display surface can be intended for viewing indicia and enabling interaction with an NFC communication device embedded within the display. A circuit can control an NFC security system that can scan for unauthorized tags affixed to the surface of a display. The NFC security system may be activated by an NFC enabled mobile phone placed proximate to the indicated region for receiving an NFC coded message from the display. An NFC security scan can be performed prior to the mobile phone reading the message from the intended NFC tag in the display. Enabling interactive display modes can allow for making selections indicated on the display or detecting motion gestures across the face of the display.

10 Claims, 6 Drawing Sheets (51) Int. Cl.
  *G06K 19/073* (2006.01)
  *H04W 4/00* (2009.01)
  *H04W 12/12* (2009.01)

(58) Field of Classification Search
  CPC ............ G06K 7/10237; G06K 7/0008; G06K 19/7707; G06K 19/72
  USPC ... 340/686.6, 10.6, 10.51, 10.1, 10.4, 572.7, 340/572.1, 854.8; 455/41.1, 41.2, 39
  See application file for complete search history.

(56) References Cited

U.S. PATENT DOCUMENTS

| | | | |
|---|---|---|---|
| 5,485,291 A | 1/1996 | Qiao | |
| 5,641,219 A | 6/1997 | Mizobe | |
| 5,720,123 A | 2/1998 | Taylor | |
| 5,867,017 A | 2/1999 | Merwin et al. | |
| 5,921,674 A | 7/1999 | Koczi | |
| 5,944,405 A | 8/1999 | Takeuchi | |
| 5,947,578 A | 9/1999 | Ayres | |
| 6,142,375 A | 11/2000 | Belka et al. | |
| 6,144,264 A | 11/2000 | Wen | |
| 6,246,778 B1 | 6/2001 | Moore | |
| 6,771,256 B1 | 8/2004 | Abraham et al. | |
| 6,786,626 B2 | 9/2004 | Wu | |
| 6,838,989 B1 | 1/2005 | Mays et al. | |
| 6,839,035 B1 | 1/2005 | Addonisio et al. | |
| 6,851,999 B2 | 2/2005 | Fong | |
| 6,965,205 B2 | 11/2005 | Piepgras et al. | |
| 7,012,544 B2 | 3/2006 | Cunningham et al. | |
| 7,046,160 B2 | 5/2006 | Pederson et al. | |
| 7,064,498 B2 | 6/2006 | Dowling et al. | |
| 7,084,769 B2 | 8/2006 | Bauer et al. | |
| 7,086,587 B2 | 8/2006 | Myllymaki | |
| 7,086,769 B1 | 8/2006 | Thompson et al. | |
| 7,098,794 B2 | 8/2006 | Lindsay | |
| 7,109,986 B2 | 9/2006 | Kerr et al. | |
| 7,167,106 B2 | 1/2007 | Haase | |
| 7,202,838 B2 | 4/2007 | Kerr et al. | |
| 7,304,577 B2 | 12/2007 | Waldner | |
| 7,375,650 B2 | 5/2008 | Lo | |
| 7,377,421 B2 | 5/2008 | Rhoads | |
| 7,378,973 B2 | 5/2008 | Dixon | |
| 7,477,152 B2 | 1/2009 | Forster | |
| 7,490,054 B2 | 2/2009 | Reade et al. | |
| 7,492,346 B2 | 2/2009 | Manabe | |
| 7,495,576 B2 | 2/2009 | Maskeny et al. | |
| 7,515,149 B2 | 4/2009 | Kerr et al. | |
| 7,564,426 B2 | 7/2009 | Poor | |
| 7,600,906 B2 | 10/2009 | Chon | |
| 7,654,723 B2 | 2/2010 | Chang | |
| 7,670,020 B2 | 3/2010 | Chang | |
| 7,695,165 B2 | 4/2010 | Chang | |
| 7,722,172 B2 | 5/2010 | Silverbrook | |
| 7,722,241 B2 | 5/2010 | Chang | |
| 7,750,810 B2 | 7/2010 | Ritter et al. | |
| 7,752,790 B1 | 7/2010 | Michael et al. | |
| 7,756,467 B2 | 7/2010 | Bent et al. | |
| 7,810,983 B2 | 10/2010 | Chang | |
| 7,817,045 B2 | 10/2010 | Onderko | |
| 7,845,823 B2 | 12/2010 | Mueller | |
| 7,850,341 B2 | 12/2010 | Mrakovich | |
| 7,868,778 B2 | 1/2011 | Kenwright | |
| 7,876,101 B2 | 1/2011 | Lee | |
| 7,903,103 B2 | 3/2011 | Osterberg et al. | |
| 7,920,050 B2 | 4/2011 | Juels | |
| 7,959,326 B2 | 6/2011 | Laporte | |
| 7,961,097 B2 | 6/2011 | Porte et al. | |
| 7,979,026 B2 | 7/2011 | Hulvey | |
| 8,014,722 B2 | 9/2011 | Abel et al. | |
| 8,018,345 B2 | 9/2011 | Xiang | |
| 8,102,797 B2 | 1/2012 | Abel | |
| 8,112,066 B2 | 2/2012 | Ben Ayed | |
| 8,117,445 B2 | 2/2012 | Werner et al. | |
| 8,126,505 B2 | 2/2012 | Tulloch | |
| 8,249,935 B1 | 8/2012 | DiMartino et al. | |
| 8,321,922 B1 | 11/2012 | Lo et al. | |
| 8,332,272 B2 | 12/2012 | Fisher | |
| 8,469,269 B2 | 6/2013 | Daily et al. | |
| 8,474,700 B1 | 7/2013 | Lewis et al. | |
| 8,655,286 B2 * | 2/2014 | Mendolia | H04B 1/0458 455/69 |
| 8,937,531 B2 | 1/2015 | Rimai et al. | |
| 2002/0030992 A1 | 3/2002 | Lefebvre | |
| 2002/0036622 A1 | 3/2002 | Jaeger et al. | |
| 2002/0154633 A1 | 10/2002 | Shin | |
| 2002/0159246 A1 | 10/2002 | Murasko et al. | |
| 2002/0186133 A1 | 12/2002 | Loof | |
| 2003/0029918 A1 | 2/2003 | Leanheart et al. | |
| 2003/0034985 A1 | 2/2003 | Needham Riddle | |
| 2003/0115096 A1 | 6/2003 | Reynolds | |
| 2004/0012486 A1 | 1/2004 | Mani | |
| 2004/0220860 A1 | 11/2004 | Persky et al. | |
| 2005/0017071 A1 | 1/2005 | Noonan | |
| 2005/0280631 A1 | 12/2005 | Wong et al. | |
| 2006/0028822 A1 | 2/2006 | Tanamachi | |
| 2006/0080819 A1 | 4/2006 | Mcallister | |
| 2006/0090384 A1 | 5/2006 | Woodruff | |
| 2006/0160488 A1 | 7/2006 | Sueoka et al. | |
| 2006/0214794 A1 | 9/2006 | Wang | |
| 2006/0215958 A1 | 9/2006 | Yeo | |
| 2006/0261938 A1 | 11/2006 | Lai | |
| 2006/0266824 A1 | 11/2006 | Hassenbueger | |
| 2006/0273176 A1 | 12/2006 | Audebert et al. | |
| 2006/0290501 A1 | 12/2006 | Hammad et al. | |
| 2006/0293956 A1 | 12/2006 | Walker et al. | |
| 2007/0008140 A1 | 1/2007 | Saarisalo et al. | |
| 2007/0013479 A1 | 1/2007 | Goel et al. | |
| 2007/0029939 A1 | 2/2007 | Burkum et al. | |
| 2007/0056871 A1 | 3/2007 | Griffiths | |
| 2007/0075145 A1 | 4/2007 | Arendonk et al. | |
| 2007/0090954 A1 | 4/2007 | Mahaffey | |
| 2007/0120772 A1 | 5/2007 | Kim et al. | |
| 2007/0145152 A1 | 6/2007 | Jogand-Coulomb et al. | |
| 2007/0188483 A1 | 8/2007 | Bonner | |
| 2007/0194879 A1 | 8/2007 | Backes et al. | |
| 2007/0215685 A1 | 9/2007 | Self et al. | |
| 2007/0229250 A1 | 10/2007 | Recker | |
| 2007/0273951 A1 | 11/2007 | Ribi | |
| 2007/0274242 A1 * | 11/2007 | Lamacraft et al. | 370/310 |
| 2008/0022160 A1 | 1/2008 | Chakraborty | |
| 2008/0040845 A1 | 2/2008 | Shoshan | |
| 2008/0064346 A1 * | 3/2008 | Charrat | G06K 7/0008 455/131 |
| 2008/0094854 A1 | 4/2008 | Coleman | |
| 2008/0101400 A1 | 5/2008 | Auterinen | |
| 2008/0117047 A1 | 5/2008 | Collins et al. | |
| 2008/0132167 A1 | 6/2008 | Bent et al. | |
| 2008/0150719 A1 | 6/2008 | Cote et al. | |
| 2008/0183581 A1 | 7/2008 | Coppolani et al. | |
| 2008/0191878 A1 | 8/2008 | Abraham | |
| 2008/0192932 A1 | 8/2008 | Graeber et al. | |
| 2008/0219227 A1 | 9/2008 | Michaelis | |
| 2008/0238706 A1 | 10/2008 | Kenwright | |
| 2008/0248815 A1 | 10/2008 | Busch | |
| 2008/0251582 A1 | 10/2008 | Nguyen | |
| 2008/0262928 A1 | 10/2008 | Michaelis | |
| 2008/0276507 A1 | 11/2008 | Hines | |
| 2008/0300985 A1 | 12/2008 | Shamp et al. | |
| 2009/0081943 A1 | 3/2009 | Dobyns et al. | |
| 2009/0085746 A1 | 4/2009 | Erickson et al. | |
| 2009/0088229 A1 | 4/2009 | Hammad et al. | |
| 2009/0102748 A1 | 4/2009 | Stoyer et al. | |
| 2009/0115614 A1 | 5/2009 | Bertin | |
| 2009/0146814 A1 | 6/2009 | Hammad et al. | |
| 2009/0168441 A1 | 7/2009 | Lin | |
| 2009/0189816 A1 | 7/2009 | Nikiti | |
| 2009/0192937 A1 | 7/2009 | Griffin et al. | |
| 2009/0193500 A1 | 7/2009 | Griffin | |
| 2009/0197551 A1 | 8/2009 | Paraskake | |
| 2009/0212919 A1 | 8/2009 | Selgrath et al. | |
| 2009/0221240 A1 * | 9/2009 | Zhang | G06K 7/0008 455/68 |
| 2009/0257242 A1 | 10/2009 | Wendman | |

(56) References Cited

U.S. PATENT DOCUMENTS

| | | |
|---|---|---|
| 2009/0258678 A1 | 10/2009 | Chava et al. |
| 2009/0292816 A1 | 11/2009 | Etchegoyen |
| 2009/0297157 A1 | 12/2009 | Nakagawa |
| 2009/0315670 A1 | 12/2009 | Naressi |
| 2010/0009627 A1 | 1/2010 | Huomo |
| 2010/0012715 A1 | 1/2010 | Williams et al. |
| 2010/0046198 A1 | 2/2010 | Hoffman |
| 2010/0066561 A1 | 3/2010 | Ulrich et al. |
| 2010/0075666 A1 | 3/2010 | Garner |
| 2010/0079416 A1 | 4/2010 | Chung et al. |
| 2010/0082485 A1 | 4/2010 | Lin et al. |
| 2010/0085774 A1 | 4/2010 | Park |
| 2010/0107463 A1 | 5/2010 | Spiro |
| 2010/0141452 A1 | 6/2010 | Lian et al. |
| 2010/0148964 A1 | 6/2010 | Broer |
| 2010/0148965 A1 | 6/2010 | Alexis et al. |
| 2010/0161410 A1 | 6/2010 | Tulloch |
| 2010/0172149 A1 | 7/2010 | Siemiet |
| 2010/0174599 A1 | 7/2010 | Rosenblatt et al. |
| 2010/0188842 A1 | 7/2010 | Yohananoff |
| 2010/0211431 A1 | 8/2010 | Lutnick et al. |
| 2010/0216396 A1 | 8/2010 | Fernandez et al. |
| 2010/0217709 A1 | 8/2010 | Aabye et al. |
| 2010/0231362 A1 | 9/2010 | Smith et al. |
| 2010/0255865 A1 | 10/2010 | Karmarkar et al. |
| 2010/0262449 A1 | 10/2010 | Monteforte et al. |
| 2010/0269383 A1 | 10/2010 | Nifenecker |
| 2010/0271839 A1 | 10/2010 | Chan |
| 2010/0274859 A1 | 10/2010 | Bucuk |
| 2010/0275265 A1 | 10/2010 | Fiske |
| 2010/0282849 A1 | 11/2010 | Mair |
| 2010/0290251 A1 | 11/2010 | Wang |
| 2010/0294835 A1 | 11/2010 | Bam et al. |
| 2010/0303230 A1 | 12/2010 | Taveau et al. |
| 2010/0306076 A1 | 12/2010 | Taveau |
| 2010/0306819 A1 | 12/2010 | Nahari et al. |
| 2010/0311326 A1 | 12/2010 | Klabunde et al. |
| 2011/0000971 A1 | 1/2011 | Onderko |
| 2011/0047759 A1 | 3/2011 | Reiter |
| 2011/0065383 A1 | 3/2011 | Frankland et al. |
| 2011/0084814 A1 | 4/2011 | Ramsch |
| 2011/0112918 A1 | 5/2011 | Mestre et al. |
| 2011/0112920 A1 | 5/2011 | Mestre et al. |
| 2011/0149596 A1 | 6/2011 | Lv |
| 2011/0165859 A1 | 7/2011 | Wengrowitz |
| 2011/0191478 A1 | 8/2011 | Eischeid et al. |
| 2011/0195748 A1 | 8/2011 | Main et al. |
| 2011/0211344 A1 | 9/2011 | Harbers |
| 2011/0225421 A1 | 9/2011 | Han et al. |
| 2011/0227487 A1 | 9/2011 | Nichol |
| 2011/0227507 A1 | 9/2011 | Salm |
| 2011/0228517 A1 | 9/2011 | Kawabat |
| 2011/0234379 A1 | 9/2011 | Lee |
| 2011/0235318 A1 | 9/2011 | Simon |
| 2011/0238995 A1 | 9/2011 | Blanco |
| 2011/0287718 A1 | 11/2011 | Abel |
| 2011/0295108 A1 | 12/2011 | Cox et al. |
| 2011/0307309 A1 | 12/2011 | Forster et al. |
| 2011/0320291 A1 | 12/2011 | Coon |
| 2011/0320314 A1 | 12/2011 | Brown |
| 2011/0320345 A1 | 12/2011 | Taveau et al. |
| 2012/0001725 A1 | 1/2012 | Chen |
| 2012/0013448 A1 | 1/2012 | Baranowski |
| 2012/0024951 A1 | 2/2012 | Graeber |
| 2012/0032632 A1 | 2/2012 | Soar |
| 2012/0039472 A1 | 2/2012 | Liu et al. |
| 2012/0059741 A1 | 3/2012 | Khan et al. |
| 2012/0061465 A1 | 3/2012 | Luo |
| 2012/0072979 A1 | 3/2012 | Cha |
| 2012/0075148 A1 | 3/2012 | Cho |
| 2012/0083205 A1* | 4/2012 | Marcu et al. ............... 455/41.1 |
| 2012/0089845 A1 | 4/2012 | Raleigh |
| 2012/0154633 A1 | 6/2012 | Rodriguez |
| 2012/0156992 A1 | 6/2012 | Walker et al. |
| 2012/0265596 A1 | 10/2012 | Mazed et al. |
| 2012/0265682 A1* | 10/2012 | Menon .................. G06Q 20/20 705/44 |
| 2013/0006847 A1 | 1/2013 | Hammad et al. |
| 2013/0106576 A1 | 5/2013 | Hinman et al. |
| 2013/0173455 A1* | 7/2013 | Adams et al. .................. 705/39 |
| 2013/0309965 A1* | 11/2013 | Hillan ......................... 455/41.1 |
| 2013/0342323 A1 | 12/2013 | Hinman et al. |
| 2013/0344805 A1* | 12/2013 | Lefley ......................... 455/41.1 |
| 2014/0070850 A1* | 3/2014 | Darwhekar et al. ............ 327/74 |
| 2014/0113551 A1* | 4/2014 | Krishnan et al. ............ 455/41.1 |

FOREIGN PATENT DOCUMENTS

| | | |
|---|---|---|
| CN | 201302803 Y | 9/2009 |
| CN | 102217410 | 10/2011 |
| EP | 112746981 | 7/2003 |
| EP | 1914631 | 4/2008 |
| EP | 2143991 | 1/2010 |
| EP | 1948995 | 4/2010 |
| EP | 2237519 | 10/2010 |
| EP | 17922781 | 10/2010 |
| EP | 2296025 | 3/2011 |
| EP | 2309431 A1 | 4/2011 |
| EP | 2366937 | 9/2011 |
| EP | 2371110 | 10/2011 |
| FR | 2783960 | 3/2000 |
| JP | 2006011422 | 1/2006 |
| JP | 2006030882 | 2/2006 |
| JP | 2006058435 | 3/2006 |
| JP | 2006349887 | 12/2006 |
| JP | 2007034362 | 2/2007 |
| JP | 2002162918 | 6/2007 |
| KR | 20100072115 | 6/2010 |
| WO | 2006031824 | 3/2006 |
| WO | 2006095212 | 9/2006 |
| WO | 2006098765 | 9/2006 |
| WO | 2006111782 | 10/2006 |
| WO | 2007002459 | 1/2007 |
| WO | 2007035835 | 3/2007 |
| WO | 2007064069 | 6/2007 |
| WO | 2008034937 | 3/2008 |
| WO | 2008063706 | 5/2008 |
| WO | 2008087431 | 7/2008 |
| WO | 2008132269 | 11/2008 |
| WO | 2008142455 | 11/2008 |
| WO | 2009028203 | 3/2009 |
| WO | 2010077194 | 7/2010 |
| WO | 2010095988 | 8/2010 |
| WO | 2010148816 | 12/2010 |
| WO | 2011010970 | 1/2011 |
| WO | 2011020041 | 2/2011 |
| WO | 2011033424 | 3/2011 |
| WO | 2011053914 | 5/2011 |
| WO | 2011088190 | 7/2011 |
| WO | 2011094384 | 8/2011 |
| WO | 2011109092 | 9/2011 |
| WO | 2011112778 | 9/2011 |
| WO | 2011121488 | 10/2011 |
| WO | 2012037255 | 3/2012 |

OTHER PUBLICATIONS

"NFC Record Type Definition (RTD)", Technical Specification NFC Forum, RTD 1.0, NFCForum-TS-RTD_1.0, (Jul. 24, 2006), 20 pgs.

"Radio Frequency Identification (RFID): A Focus on Information Security and Privacy", OECD Digital Economy Papers, No. 138, Jan. 14, 2008, 11-81.

"Radio-Frequency-IDentific@tion, http://rfid-handbook.com/", advertisement (Dec. 2, 2011), 5 pgs.

"South Korea Telecommunications Report Included BMI's Forecasts", Q2 2012, Business Monitor International Ltd., (Apr. 2012), 94 pgs.

A Near Field Communication Tool for Building Intelligent Environment using Smart Posters, International Journal of Computers and Communications, Issue 1, vol. 4, 2010, Pilar Castro Garrido, (56) References Cited

OTHER PUBLICATIONS

Guillermo Matas Miraz, Irene Luque Ruiz, and Miguel Angel Gomez-Nieto.
A Pervasive Presentator—Simplifying the Task of Presenting, Lulea University of Technology; Viktor Lindgren, Mattias Lundberg, Elias Naslund, John Viklund (2012).
A System of Secure Virtual Coupons Using NFC Technology, IEEE Computer Society, CompProceedings of the Fifth Annual IEEE International Conference on Pervasive Computing and Communications Workshops 2007 (PerComW'07); Manfred Aigner, Sandra Dominikus, Martin Feldhofer.
Amato-McCoy, Deena M. Crime stoppers: by focusing their loss prevention efforts on the entire enterprise, grocers are in a better position to combat internal and external theft. Grocery Headquarters, v77, No. 11, p. 101 (3). Nov. 2011.
Anonymous, "Near-field communications will be standard technology for mobiles", Electronics Weekly, (Feb. 21, 2007), p. 8.
Antoniou, Zoe, "NFC-Based Mobile Middleware for Intuitive User Interaction With Security in Smart Homes", Proc. of the 5th IASTED International Conference on Communication Systems and Networks (CSN'06), Aug. 28-30, 2006, Palma De Mallorca, Spain, Track 543-038, 6pgs.
Application of Near Field Communication for Health Monitoring in Daily Life; Esko Strommer, Jouni Kaartenen, Juha Parkka, Arto Ylisauko-oja, Ilkka Korhonen; Proceedings of the 28th IEEE EMBS Annual International Conference New York City, USA, Aug. 30-Sep. 3, 2006.
Bauer-Reich, C., et al. "Low-profile, high-permeability antennaless RFID tags for use on metal objects", Proceedings of the 2012 IEEE International Workshop on Antenna Technology (iWAT), (Mar. 5-7, 2012), 32-35.
Becher, Michael et al., "Mobile Security Catching Up? Revealing the Nuts and Bolts of the Security of Mobile Devices", 2011 IEEE Symposium on Security and Privacy, 96-11.
Bling: NFC Arrives in U.S., Sam Churchill, Oct. 27, 2010, http://www.dailywireless.org/2010/10/27/bling-nfc-arrives-in-u-s/.
Bovelli, S., "A Novel Antenna Design for Passive RFID Transponders on Metal Surfaces", Proceedings of the 36th European Microwave Conference, Manchester, UK (Sep. 2006), 580-582.
Broil, Gregor, et al., "Touch to Play—Exploring Touch-Based Mobile Interaction with Public Displays", 3rd International Workshop on Near Field Communication, Feb. 22, 2011, 15-20.
Cavoukian, A., "Mobile Near Field Communications (NFC)—"Tap'n Go"—Keep it Secure & Private", Information and Privacy Commissioner, Ontario, Canada/Privacy by Design (Nov. 2011), 22 pgs.
Chai, Q1, "Design and Analysis of Security Schemes for Low-cost RFID Systems", Doctor of Philosophy Thesis in Electrical and COmputer Engineering, University of Waterloo, Ontario, Canada, 2012, 184 pgs.
Cheng, Hsu-Chen, et al., "A Secure and Practical Key Management Mechanism for NFC Read-Write Mode", J. Computational Information Systems, 7:11, (2011), 3819-3828.
Cheng, Jerry, et al., "SmartSiren: Virus Detection and Alert for Smartphones", MobiSys'07, Jun. 11-4, 2007, San Juan, Puerto Rico, 258-271.
Choi, Kwanghoon, et al., "A Secure Application Invocation Mechanism in Mobile Phones for Near Field Communication", 2012 IEEE International Conference on Consumer Electronics (ICCE), Jan. 2012, 731-732.
Christian Metzger et al: "Making Radio Frequency Indentificaiton Visible—A Watchdog Tag", Fifth Annual IEEE International Conference on pervasive computing and communications workshops, Mar. 19-23, 2007.
Christianson, B., et al. (eds.), "Security Protocols", 13th International Workshop, Revised Selected Papers, Cambridge, UK, (Apr. 20-22, 2005), Lecture Notes in Computer Science, 4631, Springer-Verlag, Berlin, 354 pgs.
Close Contact: An Examination of the Future of Near Field Communications, International Journal of Management & Information Systems—First Quarter 2012 vol. 16, No. 1; Chris Rose Capella.
Cole, P.H., et al., Networked RFID Systems and Lightweight Cryptography: Raising Barriers to Product Counterfeiting, First Edition, Springer-Verlag, Berlin (2003), 350 pgs.
Connecting the Mobile Phone with the Internet of Things—Benefits of EPC and NFC Compatibility; Thomas J.P. Wiechert, Florian Michahelles, 2007.
Coppolino, Luigi, et al., "A Trusted information Agent for Security Information and Event Management", ICONS 2012: The Seventh International Conference on Systems, 6-12.
Do you talk to each poster? Security and Privacy for Interactions with Web Service by means of Contact Free Tag Readings, Peter Schoo, Massimo Paolucci, Feb. 24, 2009 First International Workshop on Near Field Communication.
Dodson, B., et al., "Micro-Interactions with NFC-Enabled Mobile Phones", Proceedings of the Third International Conference on Mobile Computing, Applications, and Services (MobiCASE), Los Angeles, CA, Oct. 2011. Retrieved from the Internet: <URL: http://mobisocial.stanford.edu/papers/mobicase11.pdf>, 20 pgs.
Elliptic Curve Certificates and Signatures for NFC Signature Records, Reasearch in Motion, Certicom Research, Jan. 1, 2011, Tony Rosati, Greg Zaverucha.
Enabling RFID in Retail, George Roussos, Birkbeck, University of London, IEEE Computer Society, Mar. 2006.
Encrypted NFC emergency tags based on the German Telematics Infrastructure, 2011 Third International Workshop on Near Field Communication, Sebastian Dunnebeil, Felix Kobler, Philip Koene, Helmut Kremar, Jan Marco Leimeister.
Enhancing Authentication in eBanking with NFC enabled mobile phones, Aug. 11, 2008, Diego Alejandro Ortiz-Yepes.
Enhancing Security and Usability Features of NFC, 2009; Beygo, Omer Kerem; Eraslan, Cihan.
European Search Report dated Nov. 25, 2016 for European Application No. EP16002075 filed Sep. 26, 2016.
Finkenzeller, K., "Known attacks on RFID systems, possible countermeasures and upcoming standardization activities", presentation slides, RFID-Systech, Bremen, Germany, Jun. 2009. Retrieved from the Internet: <URL: http://rfidhandbook.de/downloads/Finkenzeller_Systech-Bremen-2009_v1.0.pdf>, 31 pgs.
Francis, Lishoy, et al., "Practical NFC Peer-to-Peer Relay Attack Using Mobile Phones", The 6th Workshop on RFID Security (RFIDSec 2010), Istanbul, Turkey (LNCS), Jun. 7-9, 2010, 35-49.
Francis, Lishoy, et al., "Practical Relay Attack on Contactless Transactions by Using NFC Mobile Phones", In Cryptology ePrint Archive, Report 2011/618, Nov. 2011, 16pgs.
Gebhart, M, et al., "Design of 13.56 MHz Smartcard Stickers with Ferrite for Payment and Authentication", Proceedings of the 2011 3rd International Workshop on Near Field Communication (NFC), Feb. 21-22, 2011. Retrieved from the Internet: <URL: https://online.tugraz.at/tug_online/voe_main2.
getVollText?pDocumentNr=202812&pCurrPk=.
Ghanname, Taoufik. How NFC can to speed Bluetooth transactions—today. Eetimes. Feb. 14, 2006. Retrieved at http://eetimes.com/General/PrintView/4012606.
Hancke, G.P., "Practical Eavesdropping and Skimming Attacks on High-Frequency RFID Tokens", Preprint version of article published in Journal of Computer Security. vol. 19, Issue 2. (Jun. 2010). Retrieved from the Internet: <URL: http://www.rfidblog.org.uk/Hancke-JoCSSpecialRFIDJune2010.pdf>, 23 pgs.
Hancke, G.P., "Security of proximity identification systems", Technical Report, No. 752, University of Cambridge Computer Laboratory, UK (Jul. 2009), 161 pgs.
Hancke, G.P., et al., "Security Challenges for User-Orented RFID Applications within the 'Internet of Things'", J. Internet Technology, vol. 11, No. 3, 2010, 307-313.
Hardy, Robert, et al., "Touch & Interact: Touch-based Interaction of Mobile Phones with Displays", MobileHCL 2008, Proc. 10th international conference on Human computer interaction with mobile devices and services, 245-254.

(56) References Cited

OTHER PUBLICATIONS

Haselsteiner, Ernst, et al., "Security in Near Field Communication (NFC): Strengths and Weaknesses", Proceedings of the Workshop on RFID Security (RFIDSec), Graz, Austria, Jul. 12-14, 2006, 11pgs.
Hend S. Al-Khalifa: "Utilizing QR Code and Mobile Phones for Blinds and Visually Impaired People", copyright 2008.
Hinske, S., et al., "RFIDice—Augmenting Tabletop Dice with RFID", Journal of Virtual Reality and Broadcasting, vol. 5, No. 4, (2008), 12 pgs.
Husni, Emir, et aL., "Efficient Tag-to-Tag Near Field Communication (NFC) Protocol for Secure Mobile Payment", 2nd International Conference on Instrumentation, Communications, Information Technology, and Biomedical Engineering (ICICI-BME), Bandung, Indonesia, Nov. 8-9, 2011, 97-101.
International Preliminary Report on Patentability and Written Opinion dated Apr. 21, 2015 for International Application PCT/US13/031448 filed Mar. 14, 2013.
International Preliminary Report on Patentability and Written Opinion dated Jul. 31, 2012 for International Application PCT/US11/022680 filed Jan. 27, 2011.
International Preliminary Report on Patentability and Written Opinion dated Jul. 31, 2012 for International Application PCT/US11/022687 filed Jan. 27, 2011.
International Preliminary Report on Patentability and Written Opinion dated Mar. 4, 2014 for International Application PCT/US12/053322 filed Aug. 31, 2012.
International Search Report dated Nov. 21, 2012 for International Application PCT/US12/053322 filed Aug. 31, 2012.
International Preliminary Report on Patentability and Written Opinion dated Mar. 10, 2015 for International Application PCT/US12/031136 filed Mar. 14, 2013.
International Preliminary Report on Patentability and Written Opinion dated May 19, 2015 for International Application PCT/US12/031131 filed Mar. 14, 2013.
International Search Report dated Aug. 20, 2013 for International Application PCT/US13/031131 filed Mar. 14, 2013.
International Search Report dated Aug. 6, 2013 for International Application PCT/US13/031448 filed Mar. 14, 2013.
International Search Report dated Mar. 11, 2011 for International Application PCT/US11/022687 filed Jan. 27, 2011.
International Search Report dated Mar. 8, 2011 for International Application PCT/US11/022680 filed Jan. 27, 2011.
International Search Report dated May 22, 2013 for International Application PCT/US12/031136 filed Mar. 14, 2013.
Johnansson, B., "An Introduction to RFID—Information Security and Privacy Concerns", TDDC03 Projects, (Spring 2004), 14 pgs.
Juels, A., et al., "The Blocker Tag: Selective Blocking of RFID Tags for Consumer Privacy", Proceedings of ACC CCS'03, Washington, DC (Oct. 27-30, 2003), 9 pgs.
Jung, M, et al., "All-Printed and Roll-to-Roll Printable 13.56-MHz-Operated 1-bit RF Tag on Plastic Foils", IEEE Transactions on Electron Devices, (Feb. 19, 2010), 10 pgs.
Kazmi, Hammad Raza, "Security and Privacy Issues in Near Field Communication (NFC) Systems", Master Thesis, Royal Institute of Technology, Sweden, Apr. 2011, 59 pgs.
Kfir, Ziv, et al., "Picking Virtual Pockets using Relay Attacks on Contactless Smartcard Systems", Proceeding of the First International Conference on Security and Privacy for Emerging Areas in Communications Networks, Sep. 5-9, 2005, 47-58.
Kortvedt, H.S., "Securing Near Field Communication ", Thesis for Master of Science in Communication Technology, Norwegian University of Science and Technology, (Jun. 2009), 135 pgs.
Kuo, S., "A performance evaluation method for EMI sheet of metal mountable HR RFID tag", Measurement, 44 (2011), 946-953.
Kupusam'&K S et al "A Model for Remote Access and Protection of Smartphones JUsing Short Message Service", International]. Computer Science, Engineering and. Information Technology (IJCSEIT), vol. 2, No. 1, (Feb. 2012), 91-1 00.

LocaTag-An NFC-based system enhancing instant messaging tools with real-time user location; Kobler, Philip Koene, Helmut Kremar, Matthias Altmann, Jan Marco Leimeister, Apr. 20, 2010 Second International Workshop on Near Field Communication.
Location-Triggered Code Execution-Dismissing Displays and Keypads for Mobile Interaction; W. Narzt and H. Schmitzberger, C. Stephanidis (Ed.): Universal Access in HCI, Part II, HCII 2009, LNCS 5615, pp. 374-383, 2009. © Springer-Verlag Berlin Heidelberg 2009.
Long, Men, et al., "Human Perceivable Authentication: An Economical Solution for Security Associations in Short-Distance Wireless Networking", Proceedings of 16th International Conference on Computer Communications and Networks, Aug. 13-16, 2007, 257-264.
Madlmayr, Gerald, etal., "NFC Devices: Security & Privacy", Proceedings of the 3rd International Conference on Availability, Reliability and Security, Barcelona, Spain, Mar. 7, 2008, 13 pgs.
Media Clips: Implementation of an Intuitive Media Linker; Seunghyun Yoon, Kyuyun Lee, Hyunchang Shin, Samsung Electronics, 2011 IEEE International Symposium on Broadband Multimedia Systems and Broadcasting (BMSB) held Jun. 8-10, 2011.
Mitrokotsa, A., et al., "Classification of RFID Attacks", Proceedings of the 2nd International Workshop on RFID Technology—Concepts, Applications, Challenges (IWRT 2008), in conjunction with the 10th International Conference on Enterprise Information Systems, pp. 73-86, Barcelona, Spain, Jun. 2008. INSTICC Press, Portugal. Retrieved from the Internet: <URL: http://www.cs.vu.nl/~ast/publications/iwrt-2008.pdf>.
Mobile Personal Decives meet Situated Public Displays: Synergies and Opportunities; Alan Dix, Corina Sas (2010). International Journal of Ubiquitous Computing (IJUC), 1(1), pp. 11-28. http://www.hcibook.com/alan/papers/MPD-SPD-2010/.
Mulliner, Collin, "Attacking NFC Mobile Phones", 25th Chaos Communication Congress, Berlin, Germany (Dec. 2008). Retrieved from the Internet: <URL: http://www.mulliner.org/nfc/feed/collin_mulliner_25c3_attacking_nfc_phones.pdf>, 71 pgs.
Mulliner, Collin, "Vulnerability Analysis and Attacks on NFC-enabled Mobile Phones", 2009 International Conference on Availability, Reliability and Security, Fukuoka, Japan, Mar. 16-19, 2009, 695-700.
Near Field Communication in Smartphones, Simon Burkard, Berlin Institute of Technology, Germany, 2012.
Near Field Communications Handbook, vol. 13 of Internet and Communications, 2009; Mohammad Ilyas.
Newport Digital Technologies to Implement Microsoft Licensing Agreement; Prepares to Launch First Ruggedized RFID Reader with Windows Mobile Operating System. Business Wire Oct. 20, 2009.
NFC and Mobile Payments Today, Andre Filipe de Axevedo Figueiredo Cruz, Nov. 2011.
NFC Data Exchange Format (NDEF), Technical Specification, NDEF 1.0, Jul. 24, 2006.
NFC Forum Type Tags, White Paper V1.0, Apr. 1, 2009—Public.
NFC Mobile Parlor Games Enabling Direct Player to Player Interaction, 2011 Third International Workshop on Near Field Communication, Avinash Nandwani, Paul Coulton, Reuben Edwards.
NFC-Based Mobile Interactions with Direct-View Displays; Khoovirajsingh Seewoonauth, Enrico Rukzio, Robert Hardy, and Paul Holleis, IFIP Conference on Human-Computer Interaction—Interact 2009 pp. 835-838.
NFC-CAP Securty Assessment, vol. 1.0—May 11, 2009; Diego A. Ortiz-Yepes.
Ongtang, Machiagar, et al. "Semantically Rich Application-Centric Security in Android", Security and Communication Networks, vol. 5, Issue 6, Jun. 2012, 658-673.
Opoku, Samuel King, "Performance Enhancement of Large-Size NFC Multi-Touch System", Cyber Journals: Multidisciplinary Journals in Science and Technology, Journal of Selected Areas in Telecommunications (JSAT), (Oct. 2011), 52-57.
Oren, Y., "Attacks on RFID-Based Electronic Voting System", Cryptology ePrint Archive Report 2009/442 (2009). Retrieved from the Internet: <URL: http://eprint.iacr.org/2009/422.pdf>, 21 pgs.

(56) References Cited

OTHER PUBLICATIONS

Physical browsing with NFC technology; Heikki Ailisto, Tapio Matinmikko, Juha Haikio, Arto Ylisaukko-oja, Esko Strommer, Mika Hillukkala, Arto Wallin, Erkki Siira, Aki Poyry, Vili Tormanen, Tua Huomo, Tuomo Tuikka, Sonja Leskinen & Jarno Salonen, Espoo May 2007. VTT Tiedotteita—Research Notes 2400.
Programming Android; Zigurd Mednieks, Laird Domin, G. Blake Meike, Masumi Nakamura, O'Reilly Media, Inc., 2011, http://books.google.co.in/books?id=5BGBswAQSiEC&lpg=PR5&ots=xSfgivFwS&dq=rogue%20NFC%20active%20tags%20url%20phone%20peer%20to%20peer&lr&pg=PA397#.
QR Code Tech Info: MECARD Format, May 2, 2011.
QRFactory, Redirectable QR, http://dashboard.qrfactory.com/, pulled from the internet Apr. 27, 2012.
R. Rieback, N. Gaydadjiev: "A Platform for RFID Security and Provacy Adminstration", Aug. 28, 2006, retrieved from internet URL: http://www.cs.vu.nl/~ast/publications/lisa-2006.pdf.
Rahnama, Behnam, et al., "Securing RFID-Based Authentication Systems Using ParseKey+", Proceedings of the 3rd International Conference on Security of Information and Networks,_Taganrog,_Russia,_Sep. 7-11, 2010,_212-217.
RFID based applications in culture, media and creative industries, 2011 Third International Workshop on Near Field Communication, Eileen Kuehn, Jens Reinhardt, Stephan Bergemann, Prof. Dr. Juergen Sieck.
RFID Inventory Management System. Package Printing, v57 n2, pp. 34. Feb. 2010.
Rieback, M.R., et al., "A Platform for RFID Security and Privacy Administration", Proceedings of the 20th USENIX/SAGE Large Installation System Administration conference (LISA 2006), Washington D.C., (Dec. 2006). Retrieved from the Internet: <URL: http://www.rfidguardian.org/images/a/a9/Lisa.06.pdf>, 14 pgs.
Rieback, M.R., et al., "The Evolution of RFID Security", Pervasive Computing (Jan.-Mar. 2006), 62-69.
Roland, M., "Security Vulnerabilities of the NDEF Signature Record Type", Presentation from WIMA 2011—NFC Research Track, Monaco (Apr. 19, 2011). Retrieved from the Internet: <URL: http://www.wima.mc/dan/2011/CONF_PDF/Tuesday/Am/Roland.pdf>, 14 pgs.
Roland, Michael, et al., "Digital Signature Records for the NFC Data Exchange Format", Second International Workshop on Near Field Communication, Monaco, Apr. 20, 2010, 71-76.
Sabzevar, A.P., "Security in RFID Systems" Project report for GMU ECE 646 (2004). Retrieved from the Internet: <URL: http://teal.gmu.edu/courses/ECE646/project/reports_2004/SP-4_report.pdf>, 13 pgs.
Sarma, S.E., et al., "RFID Systems and Security and Privacy Implications", CHES 2002, LNCS 2523, B.S. Kaliski Jr. et al. (Eds.) (2003), pp. 454-469, 2003.
Secure contactless mobile financial services with Near Field Communication; Adeola Oluwaseyi Poroye, Aug. 2011.
Simple NDEF Exchange Protocol, Technical Specification, NFC Forum SNEP 1.0, Aug. 31, 2011.
Situated Door Displays and how to interact with them, Barbara Schmid, Jan. 16, 2012.
Smart Poster Record Type Definition Technical Specific MFC Forum TM SPR 1.1 NFCForum-SmartPoster_RTD_1.0, Jul. 24, 2006.
Suh, J., "Introduction to composite electromagnetic noise absorber technology" EMC Directory & Design Guide, (2007), 4 pgs.
Switching the role of NFC tag and reader for the implementation of Smart Posters, 2012 4th International Workshop on Near Field Communication; Dirk Volland, Kay Noyen, Onur Kayikei, Lukas Ackermann, Florian Michahelles.
Thamilarasu G et al: "Intrusion detection in RFID systems", Military Communications Conference, 2008, pp. 1-7.
The "Weak Spots" in Stacked UHF RFID Tags in NFC Applications, IEEE RFID 2010; Xiaosheng Chen, Feng Lu, Terry T.Ye*.
The Junction Protocol for Ad Hoc Peer-to-Peer Mobile Applications; Computer Science Department Stanford University; Ben Dodson, Aemon Cannon, Te-Yuan Huang, Monica S. Lam, Apr. 2011.
The Mobile Phone as Digital SprayCan; Philip Garner, Omer Rashid, Paul Coulton, and Reuben Edwards, Proceedings of the 2006 ACM SIGCHI international conference on Advances in computer entertainment technology Article No. 12, Hollywood, California, USA—Jun. 14-16, 2006.
Touch-driven Interaction Between Physical Space and Cyberspace with NFC, Longbio Chen, Gang Pan, Shijian Li, Department of Computer Science, Zhejiang University Hangzhou, China, 2011 IEEE International Conferences on Internet of Things, and Cyber, Physical and Social Computing.
Turcu, C. (ed.), Development and Implementation of RFID Technology, In-Teh, I-Tech Education and Publishing KG, Vienna, Austria (Feb. 2009), 564 pgs.
Type 1 Tag Operation Specification, Technical Specification, Technical Specification, NFC Forum T1TOP 1.1, Apr. 13, 2011.
Type 2 Tag Operation Specification Technical Specification, T2TOP 1.1 NFC Forum May 31, 2011.
Type 3 Tag Operation Specification, Technical Specification, Technical Specification, NFC Forum, T3TOP 1.1, Jun. 28, 2011.
Valkkynen, Pasi, et al., Suggestions for Visualizing Physical Hyperlinks, PERMID 2006: Pervasive Mobile Interaction Devices—Mobile Devices as Pervasive User Interlaces and Interaction Devices, Dublin, Ireland, May 7, 2006, 245-254.
Varshney, L.R., et al.., "Securing Inductively-Coupled Communication ", Information Theory and Applications Workshop (ITA) (Feb. 5-10, 2012), 6 pgs.
Vidano, R., "13.56-MHz Inductively Coupled Card Compatibility to Conducting Surfaces", Proceedings of Asia-Pacific Microwave Conference (2007), 4 pgs.
Violino, Bob. A Summary of RFID Standards. RFID Standards. RFID Journal. Jan. 16, 2005. URL at http://www.rfidjournal.com/articles/view?135.
Wang, J.J.H., "Spiral Antennas in RFID and Their Size Reduction and Performance Enhancement", 2007 IEEE International Workshop on Anti-counterfeiting, Security, Identification (Apr. 16-18, 2007), 44-47.
Wegleiter, H. et al., "Automatic Antenna Tuning Unit to Improve RFID System Performance", IEEE Transactions on Instrumentation and Measurement, vol. 60, No. 8, (Aug. 2011), 2797-2803.
Weis, Stephen A, "Security and Privacy Aspects of Low-Cost Radio Frequency Identification Systems", Security in Pervasive Computing 2003, LNCS 2802, D. Hutter et al. (Eds.) (2004) 201-212.
Yamada, I., et al., "Secure Active RFID Tag System", Ubicomp2005 Workshops, 5 pgs.
Zhu, H., et al., "Solutions of Metal Surface Effect for HF RFID Systems", 2007 International Conference on Wireless Communications, Networking and Mobile Computing (WiCom), (Sep. 21-25, 2007), 2089-2092.

* cited by examiner

NFC TAGS WITH PROXIMITY DETECTION

CROSS-REFERENCE TO RELATED APPLICATION

The present application claims the benefit of U.S. Provisional Patent Application No. 61/727,907 filed Nov. 19, 2012, which is incorporated herein by reference in its entirety.

BACKGROUND OF THE INVENTION

Radio frequency identification (RFID) devices, including near field communication (NFC) enabled RFID devices, are utilized for a variety of purposes. Often such devices are formed as tags or labels and can be utilized to associate an object with an identification code or other data, such as website data. Such RFID devices may be passive and, upon receiving a signal, such as an excitation signal from an RFID or NFC-enabled reader, may be energized. The devices can then respond with a desired communication or provide information associated with a product, item or service associated with the RFID device.

Specifically, NFC is a data exchange protocol designed to allow devices, including suitably equipped mobile phones and the like, to interact with infrastructures, such as point of sale terminals and ticket gates on transportation systems, or RFID devices in the forms of "smart posters" or "touchpoints", for example. In such situations, bringing an NFC enabled device into proximity of such infrastructure or RFID devices can cause the transmission of data to the NFC enabled device, resulting in, for example, the opening of a web page, the acceptance of a media stream via Bluetooth or any of a number of other functions.

Often the manner of associating a product, item or service with an RFID device is to physically couple or adhere the RFID device to the product or item, or associate it with advertising relating to the product, item or service, such as the "smart poster" or "touchpoint" described above. For example, RFID labels may be coupled adhesively to objects or may otherwise have surfaces that attach directly to objects. RFID tags may be secured to object in other manners, such as through the use of a plastic fastener, string or other fastening mechanism. Such RFID devices may then provide data to NFC enabled devices located or placed proximate the RFID devices.

Additionally, RFID devices are often associated with the product or item, or advertising item, in such a manner as to conceal or secure the RFID device. Such methods can provide security against the removal or misuse of an RFID device. However, in such circumstances, and particularly with NFC enabled devices designed to convey information to consumers with NFC enabled mobile phones and devices, there is a designated area (touchpoint) on an advertisement or product that indicates information can be obtained if the NFC enabled device is placed in close proximity to an area associated with the RFID device. However, as it is then known that information can be obtained from such areas, vandal or pirate RFID devices are often placed in close proximity to the indicated NFC area. The vandal or pirate devices often contain deceptive, misleading, undesired or malicious information. These devices can be coupled with or adhered to products and items, or advertisements associated with those items, leading to inappropriate or malicious information being unknowingly communicated to a user's NFC-enabled device.

In normal operation, mobile phones that have enabled NFC functions operate in NFC reader/writer mode. In this mode, the mobile phone transmits an NFC tag query consisting of modulated magnetic field pulses at a carrier frequency of 13.56 MHz. The NFC reader in the mobile phone has no prior indication that an NFC tag is proximate to the phone until an NFC tag responds to a query. Therefore, an external NFC reader such as a mobile phone will consistently transmit NFC interrogation queries until an NFC tag is detected.

SUMMARY

NFC detector circuit systems, apparatuses and methods may provide for detecting the proximate placement of an external NFC reader to a specific location on a display surface. The display surface may be intended for viewing indicia and enabling interaction with an NFC communication device embedded within the display.

In an exemplary embodiment, a circuit may control an NFC security system that scans for unauthorized tags affixed to the surface of a display. The NFC security system may be activated by an NFC enabled mobile phone placed proximate to the indicated region for receiving an NFC coded message from the display. An NFC security scan may be performed prior to the mobile phone reading the message from the intended NFC tag in the display.

Other exemplary embodiments may include enabling interactive display modes, for example, for making selections indicated on the display or detecting motion gestures across the face of the display. Such interaction may be useful for configuring the contents of the NFC tag based upon a specific user interaction.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Generally referring to FIGS. 1-6, exemplary embodiments disclosed herein may describe NFC security systems, sometimes referred to as NFC Watch Dog systems. In some exemplary embodiments, queries transmitted by the external NFC reader in reader/writer mode can be used to sense when a mobile phone is placed proximate to a specific location on a display surface using NFC detector circuitry.

An exemplary NFC security system may include an NFC reader, a security controller 111 and an inductive coil with impedance matching circuits. Functions of an NFC security system may be to detect unauthorized tags, disable such tags and alert maintenance personnel of a problem.

The detection of unauthorized tags 216 may be achieved by an NFC reader component transmitting NFC interrogation commands to an inductive coil of a detector. The inductive coil may distribute magnetic energy over the surface of the display that is being interrogated for unauthorized tags. A security controller 111 of an exemplary NFC security system may not perform interrogation on a constant basis, so that it may not interfere with a communication channel of an external NFC reader and an NFC device such as an NFC tag. The security controller 111 may activate reading on regular intervals or conditionally upon the state of a signal line, such as from another controller or sensor. The NFC detector of the detector circuit may be configured to send a signal to the NFC security system when a phone is placed proximate a specific location on the surface of a display.

Exemplary embodiments may require less complex circuit design than other solutions utilizing an NFC reader circuit. In some exemplary embodiments, the major elements of the NFC detector circuit may include an inductive receiver coil, an RF demodulator and a threshold detector. The NFC detector circuit may not decode the data signal of an external NFC reader in order to detect its proximate placement on a display surface. Additionally, the NFC detector circuit may be designed only for receiving RF signals and may not transmit RF signals, unlike an NFC reader. As such, multiple NFC detectors or detector circuits may be integrated into a display system without interfering with a communication channel of an external NFC reader or an intended NFC communication device such as an NFC tag.

In an exemplary embodiment, a display may include two or more NFC detector circuits positioned apart over the display surface so that users may indicate choices using placement of the mobile phone based on display indicia. For example, if a user of the display places an external reader such as a mobile phone directly over one of the NFC detectors of a detector circuit, then the display may indicate the user's selection, such as departure information. In the same example, a mobile phone placed over another NFC detector may indicate arrival information is being desired. Once a selection has been made by the user, the NFC tag memory may be formatted with the appropriate NDEF message, which in this example may include a link to either the arrival or departure information.

In another exemplary embodiment, a display may include multiple NFC detectors embedded over a surface. The display system may detect when the user moves the mobile phone along a path recognized by the display system, which may be referred to as a gesture, such as, for example, following a circular path along display indicia. When a gesture is recognized by the display system, a custom NFC message may be prepared for the user, which may be read by the NFC enabled mobile phone.

Exemplary embodiments may reduce power consumption in systems that utilize the NFC detector to control the active state of NFC transceivers, such as NFC readers and NFC peer-to-peer mode devices. An internal NFC reader 212A used in the NFC security system may want to transmit enough power to interrogate unauthorized tags that could be affixed to the display. The power for the interrogation function may be up to 4 watts, depending on the desired operating range and size of the transmitting NFC coil. Utilizing an NFC detector to control the active state of an NFC reader may reduce power consumption, for example by limiting interrogation functions to necessary conditions, such as when an external NFC reader is brought close to the display.

Additionally, utilizing the NFC detector for lower power consumption may enable a display system to operate from battery power instead of a main connection. In an exemplary embodiment, the display system may use a battery as backup power for situations in which the main power has been interrupted.

In another exemplary embodiment, the NFC detector may control operating modes of an NFC peer-to-peer mode reader, which may function to transmit NFC messages via Simple NDEF Exchange Protocol (SNEP) to the external NFC reader. In this exemplary embodiment, the display system may be battery powered, which may require that the peer-to-peer reader be activated only when an external NFC reader is present.

Figure 1:
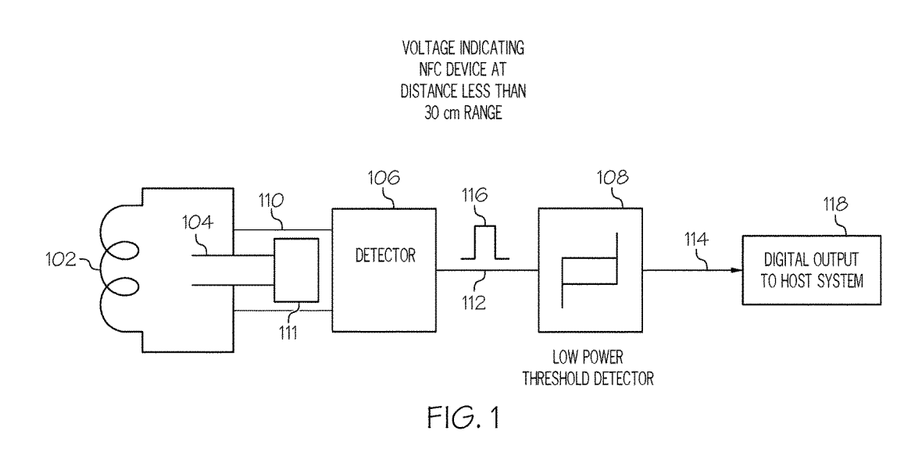
FIG. 1 is a schematic view of an exemplary embodiment of an NFC detector circuit.

Referring now to exemplary FIG. 1, a schematic view of an exemplary embodiment of an NFC detector circuit may be shown. The elements of the detector circuit may include a near field inductive receiver coil 102 with impedance matching element 104, a demodulator 106, and a threshold detector 108.

The inductive receiver coil 102 may include a distributed inductor adapted to be receptive to alternating magnetic fields in the vicinity of the coil. The capacitor 104 may form an impedance matching circuit between the inductive receiver coil 102 and a transmission line 110, such as, for example, a 50 ohm transmission line.

The impedance matching circuit may be adapted to enable a low loss transmission of signal energy between the inductive receiving coil 102 and the transmission line 110, which may be connected to other circuits of the NFC detector.

The capacitor 104 in FIG. 1 is only one exemplary embodiment of an impedance matching circuit; other circuit configurations may be possible which may, for example, increase the bandwidth across the frequency band but require the use of more complex circuitry for implementing the impedance matching circuit. Such impedance matching circuits may include any impedance matching circuit known in the art.

In this exemplary embodiment, when an external NFC reader is proximate to the NFC detector of the detector circuit, an RF signal on transmission line 110 may be received by the demodulator circuit 106 for recovery of the original data signal without an RF carrier wave. The demodulator 106 in FIG. 1 can be a diode envelope detector, used, for example, because of relatively simple circuit and low power consumption. However, if better signal discrimination or input filtering is desired, any other demodulator circuit known in the art may be implemented with the associated design trade-off in circuit complexity and power consumption. The output signal of the demodulator 106 may include DC voltage pulses 116 which may travel via the transmission line 112 to the threshold detector circuit 108.

The threshold detector circuit 108 may drive a two state output signal, normally in the "disabled" state, to the "enabled" state when the output voltage from the demodulator exceeds the "enabled" or high threshold voltage point. Separating the high and low threshold levels of the threshold detector 108 may form a hysteresis function, such that the "enabled" output state cannot be reset back to the "disabled" state, until the input voltage is lower than the "disabled" threshold voltage point. As such, the output state of the threshold detector may not oscillate if the input voltage oscillates around either voltage threshold point. The threshold detector 108 in exemplary FIG. 1 can be a low power Schmitt trigger circuit. The Schmitt trigger circuit may be utilized as it is a well-documented circuit commonly used in many circuit applications; therefore the design and implementation of a Schmitt trigger is not described in detail here. However, other threshold detectors known in the art may be implemented, as desired. The output of threshold detector 108 may drive the two state output signal through the transmission line 114 to digital output circuits for the host system 118. The digital output 118 to the host system may be implemented with necessary circuitry to buffer or latch the output state of the NFC detector for immediate or later use by the host system input circuitry.

Figure 1A:
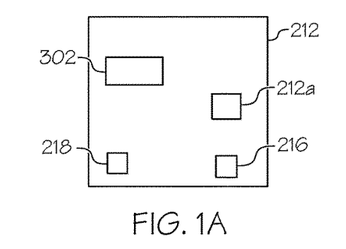
FIG. 1A illustrates a display contemplated by the present invention having an authorized NFC tag as well as an unauthorized NFC tag.

FIG. 1A of the present invention illustrates a display 212 having both an authorized NFC tag 218 and an unauthorized tag 216. The present invention contemplates that the internal NFC reader 212A of the detector circuit 302 detects an unauthorized tag 216 applied to the display 212 and creates a signal in order to disable the unauthorized tag 216.

Figure 2:
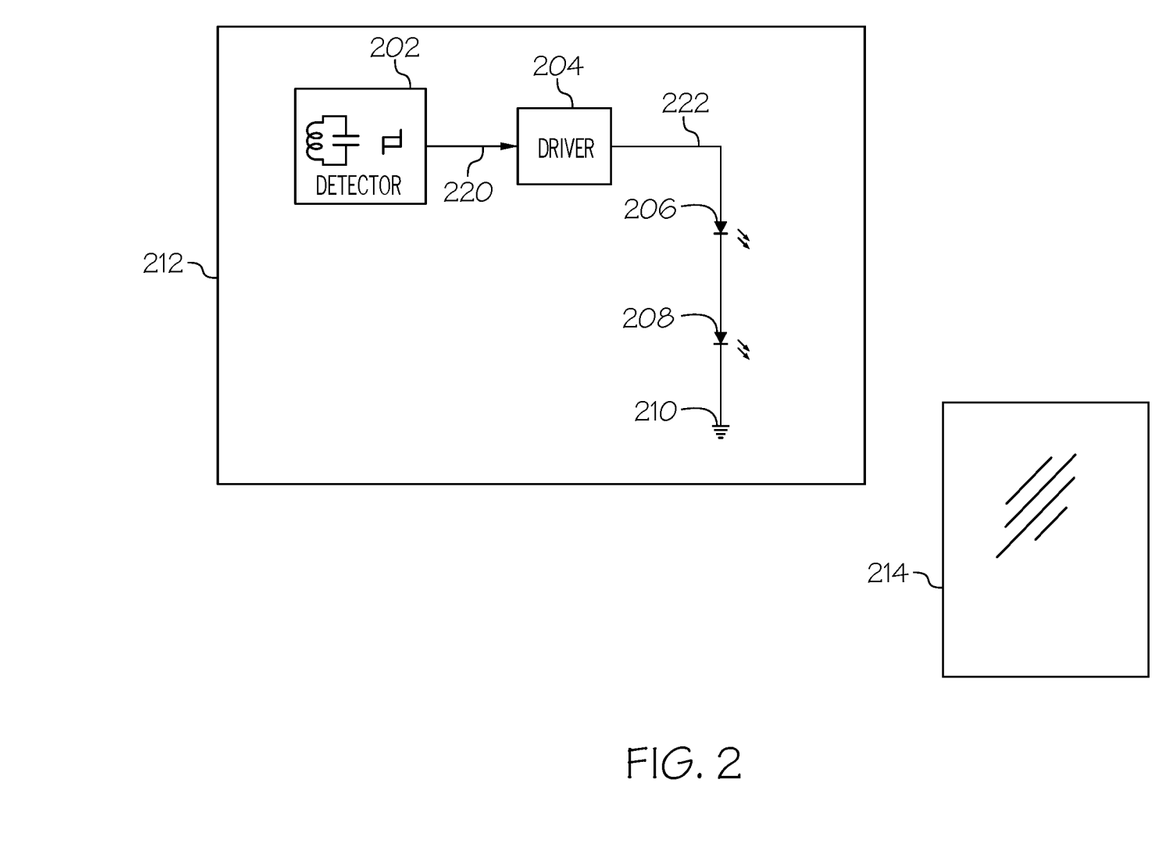
FIG. 2 is a schematic view of an exemplary embodiment of an NFC detector for controlling the illumination of Light Emitting Diodes (LEDs) integrated into an NFC reading zone.

FIG. 2 is a schematic view of an exemplary embodiment of an NFC detector of a detector circuit that may control the illumination of Light Emitting Diodes (LEDs) integrated into an NFC reading zone. The circuit may be adapted to indicate to the user that the external NFC reader device 214 has been placed in a proper or desired region for reading the intended NFC tag. The inductive element of the NFC detector and the LEDs may be located proximate to the NFC reading zone. Other circuit elements may not have critical placement with respect to the display surface and may be placed where best suited or desired. The NFC detector 202 in the exemplary circuit may drive the voltage of the control line 220 to either the "enabled" state value when an external NFC reader is proximate to the NFC detector, or to the "disabled" state value when no external NFC reader is proximate to the detector. The LED driver circuit 204 may adjust the voltage and current source on line 222 relative to ground 210 to the appropriate condition to illuminate the LEDs 206 and 208 inside the display located near the NFC reading zone.

Figure 3:
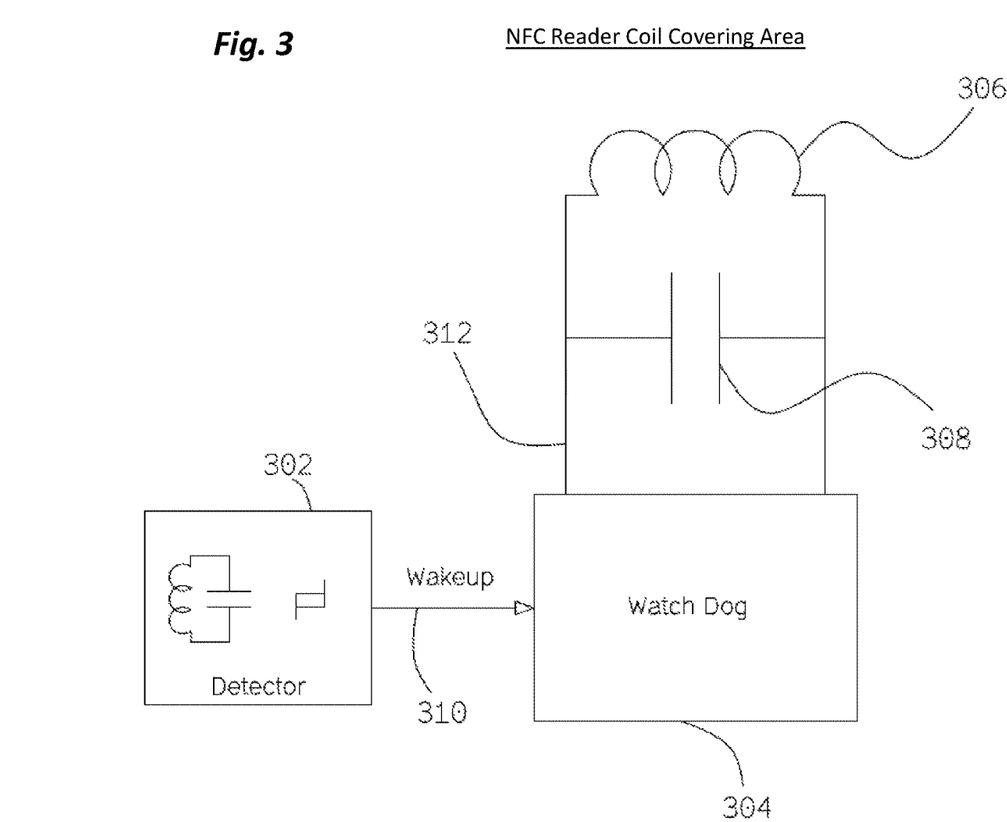
FIG. 3 is a schematic view of an exemplary embodiment of an NFC for activating an NFC security security system when an external NFC reader is placed proximate to an NFC reading zone that contains an NFC tag.

FIG. 3 is a schematic view of an exemplary embodiment of an NFC detector of a detector circuit that may activate an NFC security system when an external NFC reader, such as a mobile phone, is placed proximate to an NFC reading zone that contains an NFC tag. The NFC detector circuit 302 may drive the line 310 with an output voltage level signifying the "enabled" state to the security system 304. Upon sensing the "enabled" state voltage on the wakeup control line 310, the security system may perform an NFC inventory command with an internal NFC reader 212A. The internal NFC reader 212A may transmit NFC air protocol commands through the cable 312 to the matching network 308 and then to the transmitting coil 306. If the security system discovers an unauthorized tag, then appropriate actions may be taken, such as, for example, disabling the tag or sending a help request to maintenance personnel. When the NFC security function is complete, the system may transition to a sleep mode for minimal power consumption. Subsequently, the NFC detector circuit may remain idle for a specified time, to allow the external NFC reader to transfer contents of the authorized NFC tag without interference from the NFC security system.

Figure 4:
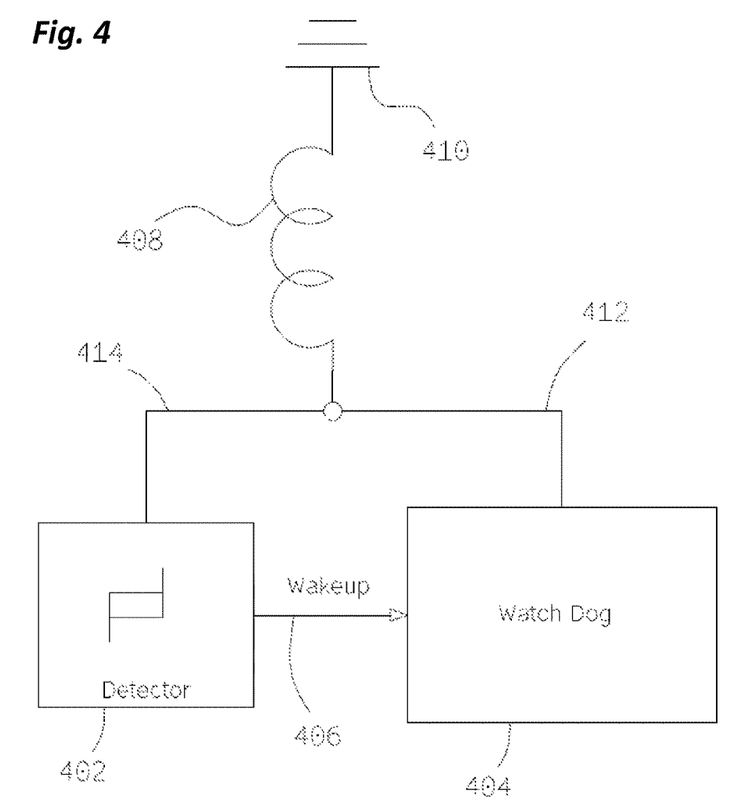
FIG. 4 is a schematic view of an exemplary embodiment of an NFC detector for activating the NFC security system when an external NFC reader is placed close to an inductive coil.

FIG. 4 is a schematic view of an exemplary embodiment of an NFC detector that may activate the NFC security system when an external NFC reader, such as a mobile phone, is placed close to a common inductive coil 408. The inductive coil may include a common element to both the detector and the security system. The use of a common coil may be such that each circuit establishes an exclusive connection to the cable 412 that connects to the common coil 408. A "detect" state and a "security" state may be used for selecting a connection to a common NFC coil 408. The initial and nominal state for the system may be the "detect" state. When the display system is in the "detect" state, the NFC detector circuit may have priority control of the common NFC coil 408, while the security system may be disconnected from the common coil 408 and configured to a low power sleep mode. The NFC detector may continually monitor for signals from an external NFC reader, such as a mobile phone. Upon detecting a signal from an external reader, the system may transition to the "security" state. In the "security" state, the NFC detector may disconnect from the common NFC coil 408 by open circuiting the connection to the cable 412. The NFC detector may then drive the voltage of the wake up line 406 to the "enabled" state. The security system may detect the "enabled" state of the wake up line 406 and may transition to the "security" state. Upon transitioning to the "security" state, the security system may connect the common NFC coil 408 by switching the circuit connection of the system to cable 412 from an open circuit to a short circuit. The security system may then issue NFC inventory commands to the common coil 408 to check for unauthorized tags affixed to the display. If unauthorized tags are affixed to the display, the security system may perform actions such as attempting to disable the unauthorized tag or signaling a request for maintenance personnel to remove the unauthorized tag. Upon completion of the security operation, the security system may open the circuit connection to cable 412, may signal to the NFC detector that the security mode is complete, and may then transition to the low power operating state. The system state may then be returned to a "detect" mode. Upon switching from "security" state to "detect" state, the NFC detector circuit may remain idle for a specified time to allow the external NFC reader to transfer the contents of the authorized NFC tag without interference from the NFC security system.

Figure 5:
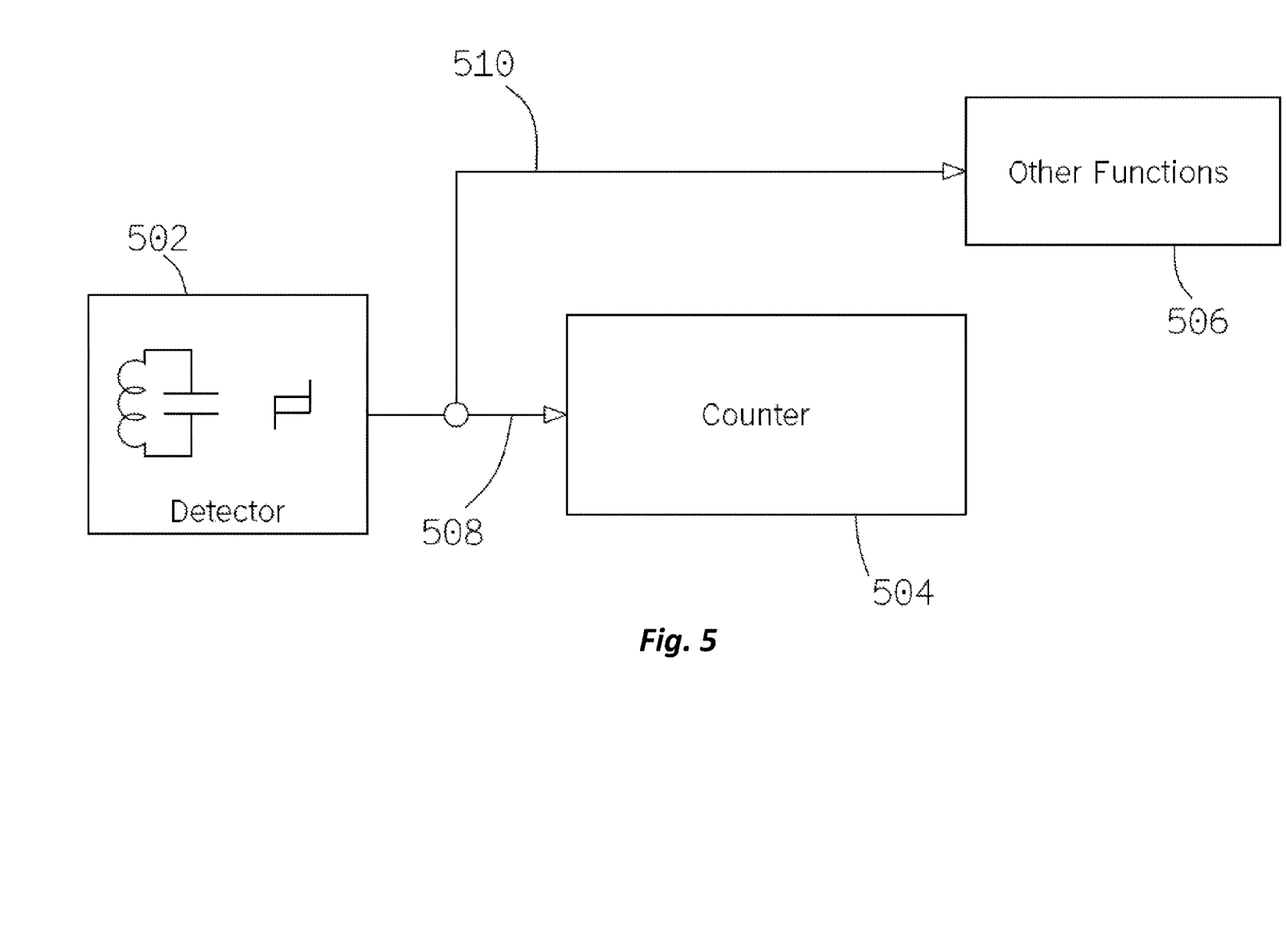
FIG. 5 is a schematic view of an exemplary embodiment of an NFC detector incorporating a counter circuit recording the number of instances that an external NFC reader is placed proximate to a receiving inductive coil of an NFC detector.

FIG. 5 is a schematic view of an exemplary embodiment of an NFC detector 502 that may incorporate a counter circuit 504 that may record the number of instances that an external NFC reader, such as a mobile phone, is placed proximate to a receiving inductive coil of an NFC detector. The stored value of the counter circuit may be used, for example, to determine metrics for the effectiveness of the display. The signal line 510 may be routed to other functions 506 that sense the state of the NFC detector output signal. The other functions 506 may include, for example, an NFC security system or an interactive display system as described above.

Figure 6:
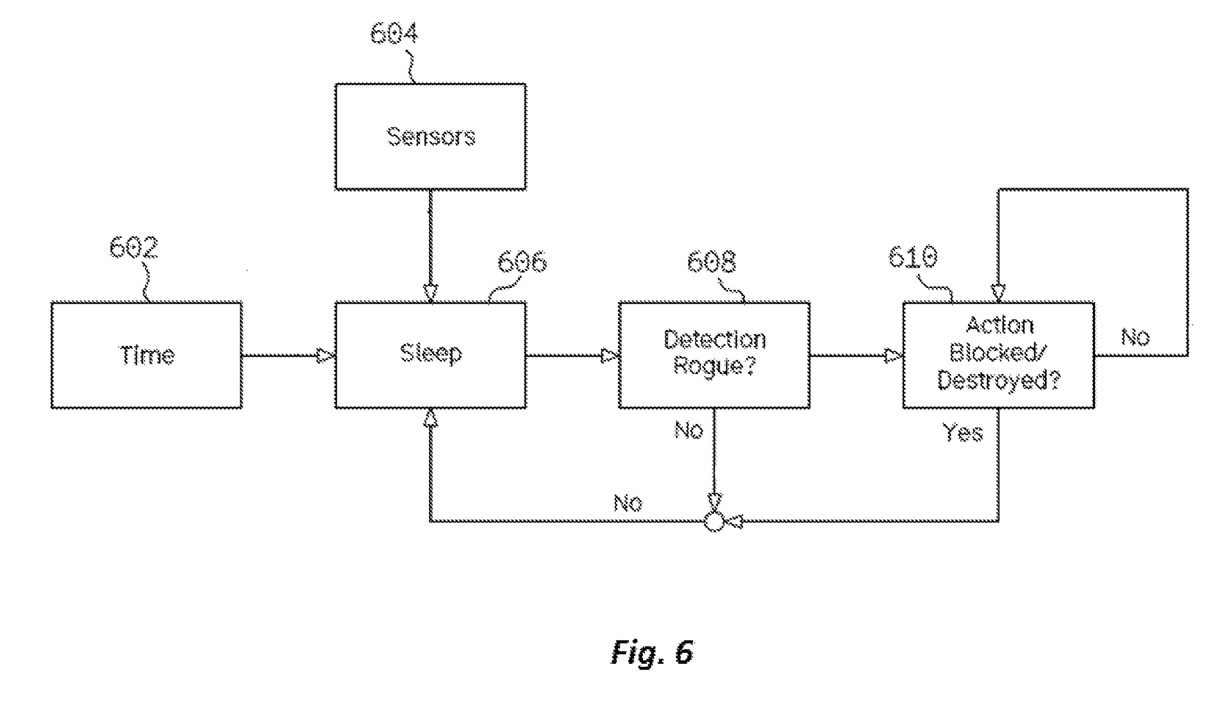
FIG. 6 is an exemplary flowchart showing an order of operations for an NFC security system.

FIG. 6 is an exemplary flow chart describing aspects of the NFC security system. In this exemplary embodiment, time 602 may represent any time after an NFC security system is implemented and/or triggered. The system can include sensors 604 which work to detect any undesired or rogue NFC signals. Thus, if sensors 604 are active and do not detect any rogue signals, the system may go into sleep 606 mode. If sensors 604 are active and detect a rogue signal, a desired response action 610 may be taken. The response action can include blocking the rogue signal or destroying the rogue device. If the action 610 is successful, the system can return to sleep 606 mode. If the action is unsuccessful, the system may try to take the desired action 610 again, or a signal may be dispatched to appropriate personnel. As can be appreciated by the above, any other courses of action using other components may also be utilized.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A NFC security system for an advertising display, comprising:
   a display;
   a NFC detector circuit having a security controller and at least one NFC detector positioned on a portion of a surface of the display;
   at least one authorized NFC tag in proximity to the display;
   an external NFC reader placed in proximity to the at least one NFC detector to form an NFC reading zone;
   the at least one NFC detector having an inductive coil, the inductive coil distributing a magnetic energy over a surface of the display; and
   where an internal NFC reader detects an unauthorized tag applied to the display and creates a signal with the inductive coil to disable the unauthorized tag.

2. The system of claim 1, wherein the system further comprises generating an alert upon detecting the unauthorized tags.

3. The system of claim 1, wherein the system further comprises
   an RF demodulator;
   a threshold detector that may activate an NFC security system when an external NFC reader is placed proximate to an NFC reading zone that contains an NFC tag; and
   an impedance matching element.

4. The circuit of claim 3, wherein the coil includes a distributed inductor adapted to be receptive to alternating magnetic fields in a vicinity of the coil.

5. The circuit of claim 3, wherein the impedance matching element is a capacitor.

6. The circuit of claim 5, wherein the capacitor forms an impedance matching circuit between the inductive receiver coil and a transmission line.

7. The circuit of claim 3, wherein the detector circuit is provided on a surface of an advertising display.

8. The circuit of claim 7, wherein the display detects a user's movement of the external NFC reader and a message is generated for a user.

9. The circuit of claim 3, wherein the threshold detector generates energy to interrogate NFC tags in a NFC reader proximity.

10. The circuit of claim 3, wherein the threshold detector operates between a disabled state and an enabled state.

* * * * *